(12) United States Patent
Hofius

(10) Patent No.: US 7,478,984 B2
(45) Date of Patent: Jan. 20, 2009

(54) SYSTEMS AND METHODS OF TRAILERING VEHICLES

(76) Inventor: Dale A. Hofius, 4579 Jane La., Erie, PA (US) 16510

( * ) Notice: Subject to any disclaimer, the term of this patent is extended or adjusted under 35 U.S.C. 154(b) by 0 days.

(21) Appl. No.: 11/463,453

(22) Filed: Aug. 9, 2006

(65) Prior Publication Data

US 2008/0036172 A1 Feb. 14, 2008

(51) Int. Cl.
B60P 7/08 (2006.01)

(52) U.S. Cl. .............. 410/27; 410/14; 410/24; 410/26; 410/30; 414/499

(58) Field of Classification Search .......... 410/14, 410/24, 25, 26, 27, 29.1, 30; 414/496, 498, 414/499, 501, 541, 545
See application file for complete search history.

(56) References Cited

U.S. PATENT DOCUMENTS

| | | | |
|---|---|---|---|
| 4,597,712 A | 7/1986 | Smith | |
| 4,668,142 A | 5/1987 | Fity et al. | |
| 4,759,668 A | 7/1988 | Larsen et al. | |
| 4,792,268 A | 12/1988 | Smith | |
| 4,797,049 A | 1/1989 | Gearin et al. | |
| 4,919,582 A | 4/1990 | Bates et al. | |
| 4,957,407 A | 9/1990 | Gearin | |
| 5,071,298 A | 12/1991 | Conzett | |
| 5,253,975 A | 10/1993 | Takaguchi | |
| 5,415,505 A | 5/1995 | Halpin et al. | |
| 5,427,485 A * | 6/1995 | Henderson et al. | ............ 410/26 |
| 5,454,686 A | 10/1995 | Gearin et al. | |
| 5,567,111 A | 10/1996 | Gearin et al. | |
| 6,640,984 B2 | 11/2003 | Gearin et al. | |
| 6,746,200 B1 | 6/2004 | Rinke | |

* cited by examiner

*Primary Examiner*—Stephen Gordon
(74) *Attorney, Agent, or Firm*—James J. Bindseil

(57) ABSTRACT

A vehicle trailering system comprises a towing vehicle comprising a hitch mounting mechanism, and a trailer connectable thereto. The trailer comprises a body defining an interior space sized to fit at least one vehicle and having first and second sets of spaced-apart carrying members attachable to opposite sides of the body, thereby defining respective first and second loading levels. The trailer further comprises a gate movable between the first and second levels along first and second support members. First and second connecting members are respectively attachable to the gate and are operable to movably carry the gate with respect to the first and second support members. The system further comprises an actuator system connected to a synchronization system, which are operable to synchronize the movement of the first and second connecting members along the respective longitudinal lengths of the first and second support members. Associated trailering methods are also provided.

14 Claims, 9 Drawing Sheets

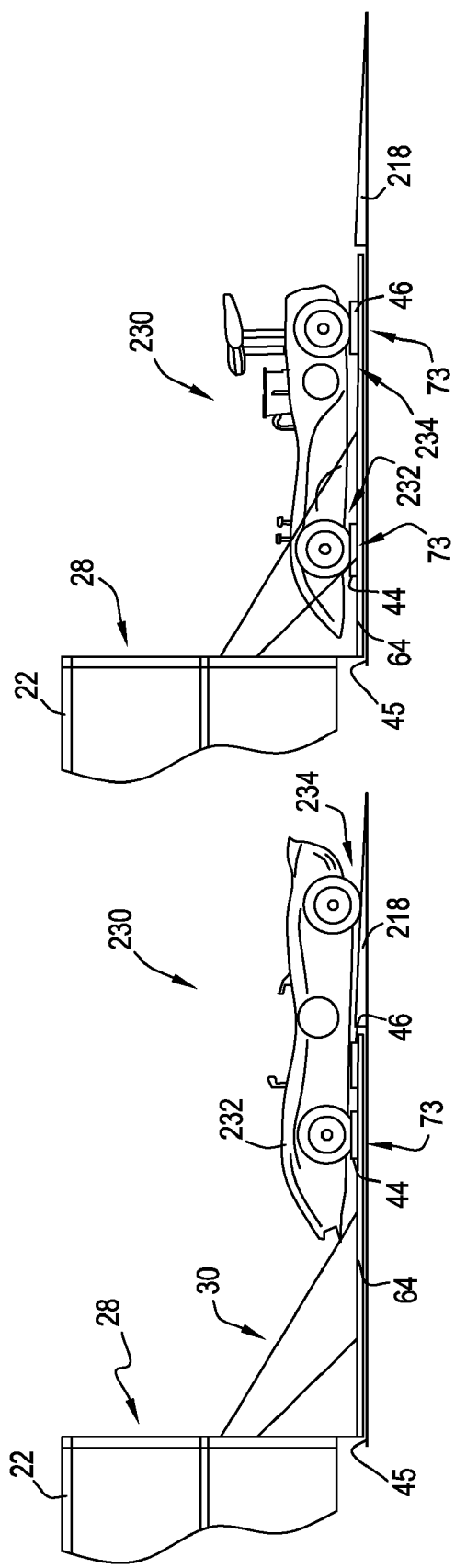
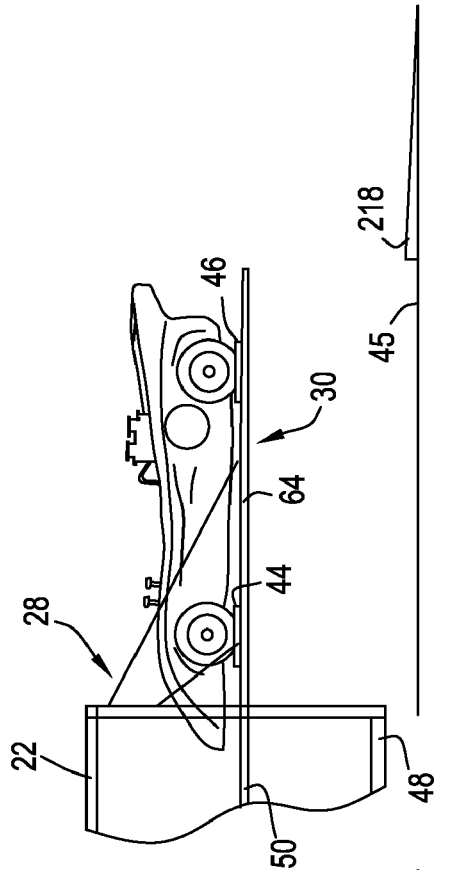
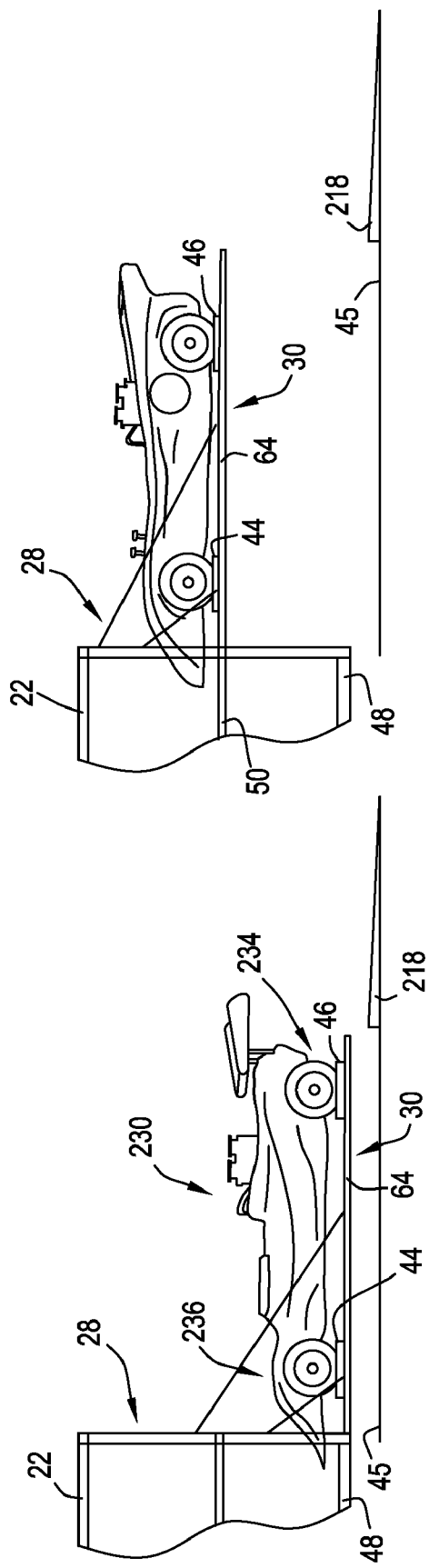

SYSTEMS AND METHODS OF TRAILERING VEHICLES

BACKGROUND

The present invention relates to systems and methods of trailering vehicles, and more specifically, to systems and methods of loading vehicles into, transporting, and/or unloading vehicles out of a trailer.

Many different structures are known for hauling a plurality of vehicles. These trailer structures typically involve at least two levels of support structures, thereby enabling a first vehicle to be attached to a first level of the trailer and a second vehicle to be attached to a second, higher level of the trailer.

Typical multi-vehicle trailer systems have a number of problems, however, which prevent these typical trailers from being fully optimized. For example, the support structures in such systems typically include floor members that divide the inside of the trailer into at least two compartments—a first compartment defined by the first support structure, the side walls and the bottom surface of second support structure; and a second compartment defined by the second support structure, the side walls and the roof of the trailer. A disadvantage of such multi-vehicle trailer systems having two distinct compartments within which to load the vehicles is that when the trailer is empty, the height of each compartment is too small, for example, to allow a person to stand inside the trailer and perform work. For example, some methods of loading vehicles into and unloading vehicles from trailers require a person to enter the trailer, which may be dangerous and inconvenient with such limited height compartments.

Additionally, some methods of loading vehicles into and unloading vehicles from trailers require more than one person to manage the lifting and pulling mechanisms. The use of more than one person adds to the expense of using the system.

Further, such multi-level trailers require a lifting mechanism, such as a lift gate, to lift the vehicle to or from a given storage level. Many existing lift gates utilize an actuator to move the gate among the given levels. Many lift gates require the actuator movement to be equal to the movement of the gate, and further require the movement of the actuator to be in the same direction as the movement of the gate. This often requires the use of actuators that awkwardly extend well beyond the height of the corresponding trailer. Such extending actuators raise safety concerns, as often the actuator is vulnerable to damage when it is fully extended supporting the full load of the raised gate. Additionally, such extending actuators may not be feasible in confined spaces.

Additionally, some of the existing lift gates also do not synchronize the movement of the two side ends of the gate. The lack of synchronization is dangerous and can slow the process of lifting the vehicle while the gate is leveled.

SUMMARY

Thus, there is a need for improved multi-vehicle trailer systems.

In some aspects, a vehicle trailering system comprises a towing vehicle comprising a hitch mounting mechanism, and a trailer connectable to the hitch mounting mechanism. The trailer comprises a body defining an interior space sized to fit a vehicle. Further, the trailer comprises a first set of spaced-apart carrying members attachable to opposite sides of the body and defining a first loading level, and a second set of spaced-apart carrying members attachable to the opposite sides of the body and defining a second loading level. Additionally, the trailer comprises a gate movable between a first position corresponding to the first level and a second position corresponding to a second level, wherein the second level is above the first level. The gate further comprises a first end and a second end defining a gate length and a first side and a second side defining a gate width. The trailer further comprises a first support member and a second support member each having a longitudinal length extending from the first level to the second level. The first support member is spaced apart from the second support member and adjacent to the first end of the gate, while the second support member is adjacent to the first end of the gate. The trailer further comprises a first connecting member and a second connecting member respectively movable against the first support member and the second support member and along the respective longitudinal lengths. The first connecting member is attachable to the first end of the gate, and the second connecting member is attachable to the second end of the gate. The trailer also comprises an actuator system, operable to move the gate, comprising a first actuator mechanism and a second actuator mechanism each having a first extended position corresponding to the first position of the gate and a second contracted position corresponding to the second position of the gate. Additionally, the trailer comprises a synchronization assembly connectable between the first actuator mechanism, the second actuator mechanism, the first connecting member, and the second connecting member, wherein the synchronization assembly synchronizes the movement of the first connecting member and the second connecting member along the respective longitudinal lengths of the first support member and the second support member.

In another aspect, a trailer comprises a first set of spaced-apart carrying members attachable to opposite sides of the body and defining a first loading level, and a second set of spaced-apart carrying members attachable to the opposite sides of the body and defining a second loading level. Additionally, the trailer comprises a gate movable between a first position corresponding to the first level and a second position corresponding to a second level, wherein the second level is above the first level. The gate further comprises a first end and a second end defining a gate length and a first side and a second side defining a gate width. The trailer further comprises a first support member and a second support member each having a longitudinal length extending from the first level to the second level. The first support member is spaced apart from the second support member and adjacent to the first end of the gate, while the second support member is adjacent to the first end of the gate. The trailer further comprises a first connecting member and a second connecting member respectively movable against the first support member and the second support member and along the respective longitudinal lengths. The first connecting member is attachable to the first end of the gate, and the second connecting member is attachable to the second end of the gate. The trailer also comprises an actuator system, operable to move the gate, comprising a first actuator mechanism and a second actuator mechanism each having a first extended position corresponding to the first position of the gate and a second contracted position corresponding to the second position of the gate. Additionally, the trailer comprises a synchronization assembly connectable between the first actuator mechanism, the second actuator mechanism, the first connecting member, and the second connecting member, wherein the synchronization assembly synchronizes the movement of the first connecting member and the second connecting member along the respective longitudinal lengths of the first support member and the second support member.

In yet another aspect, a method of trailering vehicles comprises carrying a vehicle on at least one vehicle trolley, wherein the at least one vehicle trolley is movably supported by at least one of a first set of spaced apart carrying members, a second set of spaced apart carrying members and a set of spaced apart gate carry members. The set of gate carrying members are operable to communicate with both the first set of carrying members and the second set of carrying members. Further, the method comprises moving opposite sides of the gate in synchronization between a first position and second position while the gate is carrying the vehicle trolley and the vehicle. The first position corresponds to a loading or unloading level, and the second position corresponds to a level of either the first set of carrying members or the second set of carrying members. Also, the method comprises moving the vehicle trolley carrying the vehicle between the gate and an interior space defined by a trailer body. Additionally, the method comprises removably securing the vehicle trolley carrying the vehicle within the interior space.

BRIEF DESCRIPTION OF THE DRAWINGS

FIG. 8 is a side view of one aspect of the lift mechanism at a first position and the positioning of the front wheels of a vehicle on a first vehicle trolley;

FIG. 9 is a side view of one aspect of positioning the rear wheels of the vehicle of FIG. 8 on a second trolley;

FIG. 10 is a side view of the lift mechanism moving the vehicle of FIGS. 8 and 9 into a second position corresponding to the first level of the multi-vehicle trailer system;

FIG. 11 is a side view of operating the lift mechanism moving the vehicle of FIGS. 8 and 9 into a third position corresponding to the second level of the multi-vehicle trailer system.

DETAILED DESCRIPTION

The present system, apparatus and methods now will be described more fully with reference to the accompanying drawings, in which aspects of the invention are shown. The system, apparatus and methods may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

Figure 1:
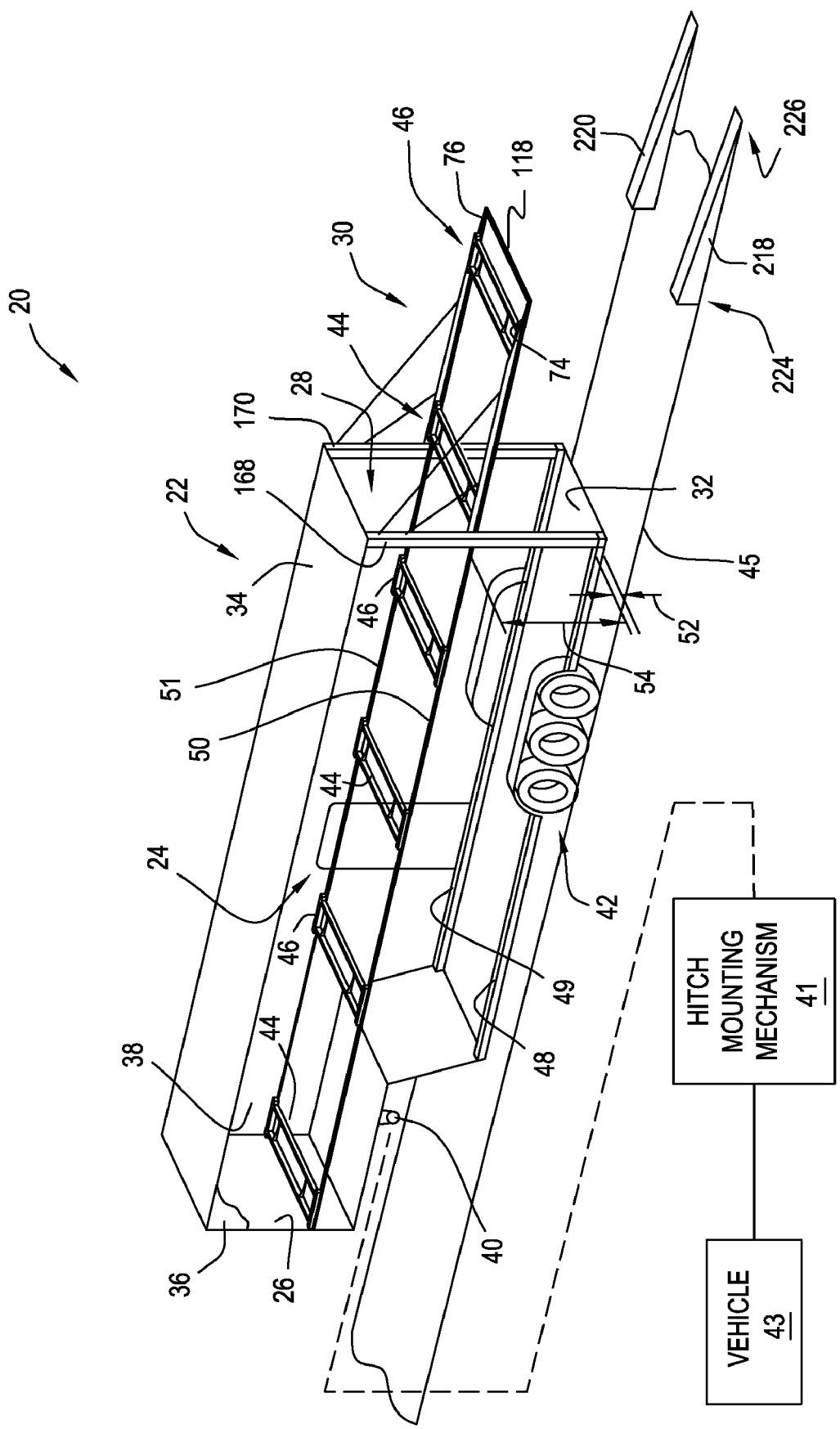
FIG. 1 is a perspective view of one aspect of a multi-vehicle trailer system.

Referring to FIG. 1, in one aspect, a multi-vehicle trailer system 20 includes a trailer body 22 which defines an interior space 24 sized to fit one or more vehicles. Trailer body 22 generally comprises an elongated cylinder having a closed first end 26 opposing an open end 28 that may be closed by a door (not shown) and/or a gate mechanism 30. Further, trailer body 22 may include a floor 32 opposing a ceiling 34, as well as opposing side walls 36, 38. Trailer system 20 may further include a hitch mechanism 40 and a wheel assembly 42 which allow trailer system 20 to be towed. Hitch mechanism 40 is operable to connect to a corresponding hitch mounting mechanism 41 on a vehicle 43, such as a truck, capable of towing trailer body 20. Wheel assembly 42 includes one or a plurality of pairs of wheels connected via an axle, wherein the axle supports trailer body 22. Thus, when hitched to vehicle 43, trailer system 20 is supported at one end by vehicle 43 through hitch mechanism 40 and at the other end by wheel assembly 42.

Figure 2:
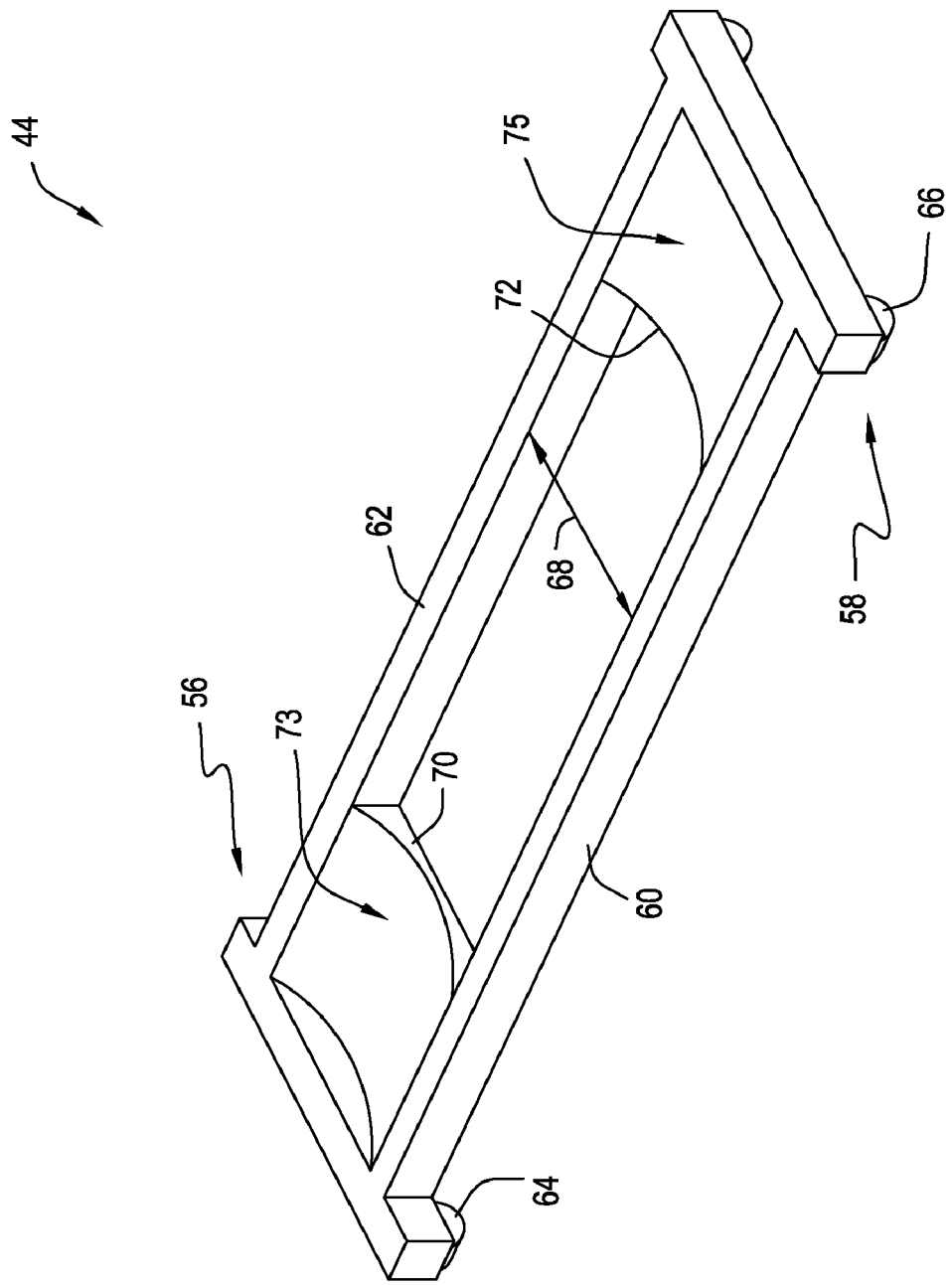
FIG. 2 is a perspective view of one aspect of a vehicle trolley associated with the multi-vehicle trailer system of FIG. 1.

Referring to FIGS. 1 and 2, trailer system 20 may further include a first vehicle trolley 44 used in combination with a second vehicle trolley 46 to respectively support a vehicle on opposing carrying members 48 and 49 or 50 and 51 (FIG. 1) that extend along respective walls 36 and 38 within trailer body 22 between at least a portion of the distance from first end 26 to second end 28. Carrying members 48-51 may each comprise, for example, a rail, a set of bearings, a set of aligned wheels and/or an open channel secured to side walls 36, 38 of trailer body 22 and operable to movably support trolleys 44, 46. For example, carrying members 48 and 49 may be respectively secured to walls 36 and 38 at a first height 52 relative to floor 32 and corresponding to a first vehicle-storing level of trailer system 20. Similarly, carrying members 50 and 51 may be respectively secured to walls 36 and 38 at a second height 54 relative to floor 32 and corresponding to a second vehicle-storing level of trailer system 20. Generally, carrying members 48-51 are positioned substantially parallel to floor 32, and/or substantially parallel to the ground when trailer system 20 is in a loading and/or unloading mode. Further, second height 54 is generally greater than first height 52, where the distance between the heights may vary depending on the size of trailer body 22 and/or depending on the size of a desired vehicle to be stored within trailer body 22. Further, carrying members 48-51 may be fixed at first height 52 and second height 54, respectively, or they may be movably secured at any given first height 52 and second height 54, respectively. Additionally, carrying members 48-49 and 50-51 may comprise a plurality of opposing segments, where the height of each segment may be varied independently, and the overall length of the combined segments may vary, thereby enabling mixed use of interior space 24 and/or to accommodate vehicles of varying sizes.

Referring more specifically to FIG. 2, each vehicle trolley, such as trolley 44, may include a first carriage 56 and a second carriage 58 fixed together by connecting members 60 and 62. Each carriage 56, 58 further includes at least one bearing assembly 64 and 66, respectively, that corresponds with the respective carrying member 48-51, thereby allowing trolley 44 to move within interior space 24 between the ends 26, 28. For example, each respective bearing assembly 64 and 66 may comprise a wheel rotatably mounted on an axle rotatably affixed to the body of the respective carriage, a ball bearing member, a groove or channel, a rail or flange, or any other structure that corresponds with the structure of the respective carrying member 48-51 and allows relative movement between the two.

Additionally, connecting members 60 and 62 are spaced apart by a predetermined distance 68 such that a tire of a vehicle supported by trolley 44 may be secured between the connecting members 60 and 62. As such, predetermined distance 68 may be sized to be less than the diameter of a respective vehicle tire. Further, connecting members 60 and 62 may be affixed to one another by securing members 70 and 72, which resist movement of the respective connecting members 60, 62 away from one another when a tire from a vehicle is supported by connecting members 60, 62. In some aspects, securing members 70 and 72 define a plate-like member having opposing sides connected to the respective connecting members 60, 62, with another side affixed to the body of the respective carriage 56, 58, and having a concave top surface for receiving the wheel of the vehicle. In other aspects, securing members 70 and 72 may be bar and/or rod members. As such, securing members 70 and 72, either alone or in combination with connecting members 60 and 62, define respective wheel beds 73 and 75 in which wheels of a vehicle may be received and secured to the respective trolley. In any case, securing members 70 and 72 generally secure together the connecting members 60, 62 at one or a plurality of positions extending from the ends adjacent to the respective carriages 56, 58 to a position slightly to the interior of the interior wall of a tire of a supported vehicle.

Further, one or both vehicle trolleys 44, 46 also may be movable along gate mechanism 30 to load or unload vehicles into or out of trailer body 22. For example, one or both vehicle trolleys 44, 46 also may be movable along gate mechanism 30 to transfer a vehicle between the ground outside of trailer body 22 to one of the first or second sets of carrying members 48, 49 or 50,51 respectively at the first or second level within trailer body 22. For example, in some aspects, first and second carriage 56, 58 of a respective trolley 44, 46 may be movable relative to gate carrying members 74, 76 (FIG. 1) running along the respective sides of gate mechanism 30. Gate carrying members 74, 76 may be substantially similar in structure to either of first or second sets of carrying members 48, 49 or 50, 51, as described above. As will be discussed in more detail below, in some aspects, gate mechanism 30 is movably connected at one end to trailer body 22 in a manner that provides both rotational and linear movement with respect to trailer body 22. For example, in some aspects, a rotational connection to trailer body 22 allows gate mechanism 30 to be moved between substantially parallel and substantially perpendicular positions with respect to trailer floor 32, which correspond to an open or trolley loading/unloading position and a closed position, respectively. Further, for example, in some aspects, a linear connection allows gate mechanism 30 to move to align gate carrying members 74, 76 with either of first or second sets of carrying members 48, 49 or 50, 51 to allow trolleys 44, 46, and hence vehicles supported by the respective trolleys, to be moved into and out of positions inside of trailer body 22.

Figure 3:
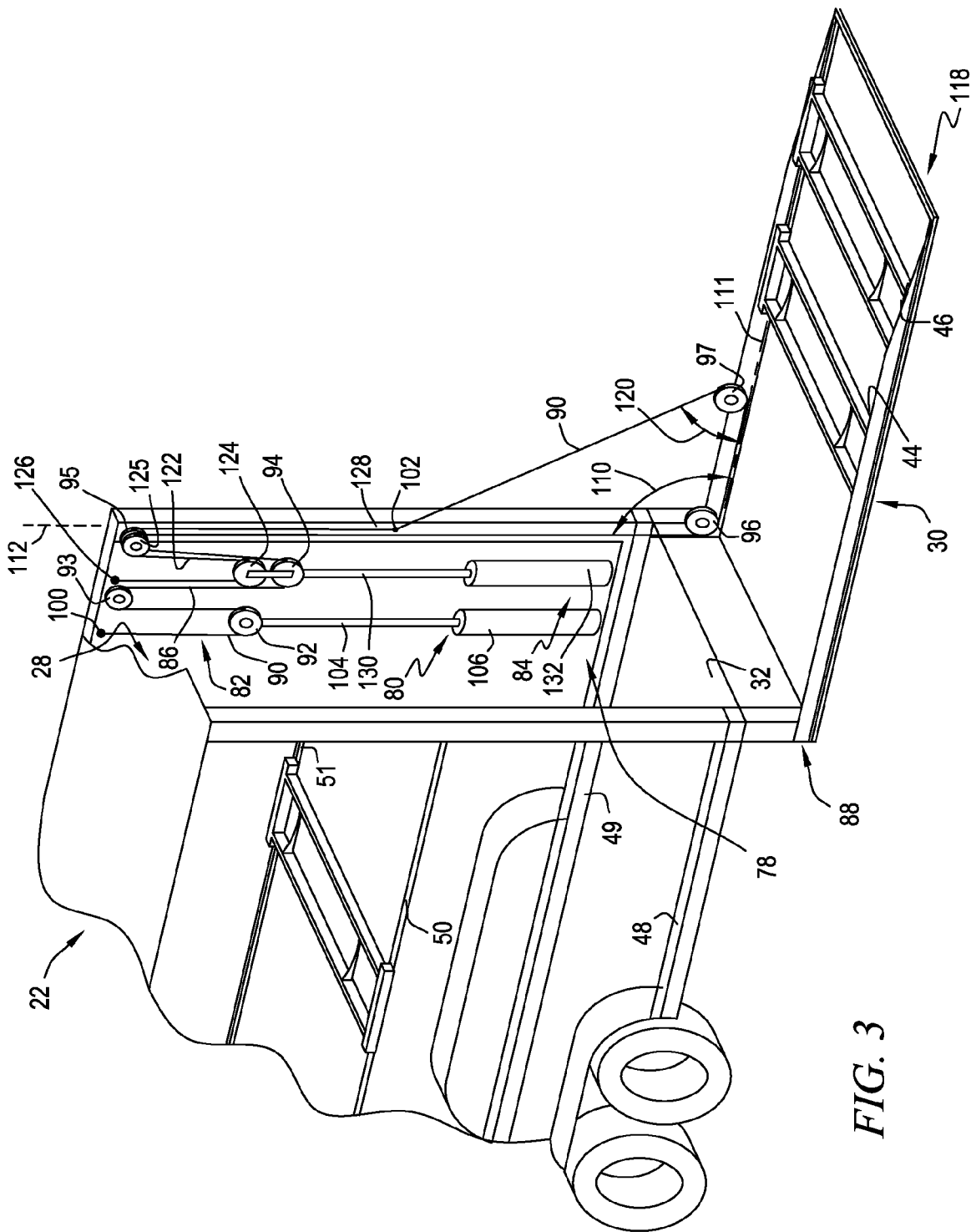
FIG. 3 is a partial, cut-away side view of a lifting mechanism associated with the multi-vehicle trailer system of FIG. 1, wherein the lifting mechanism is in a first position.
Figure 4:
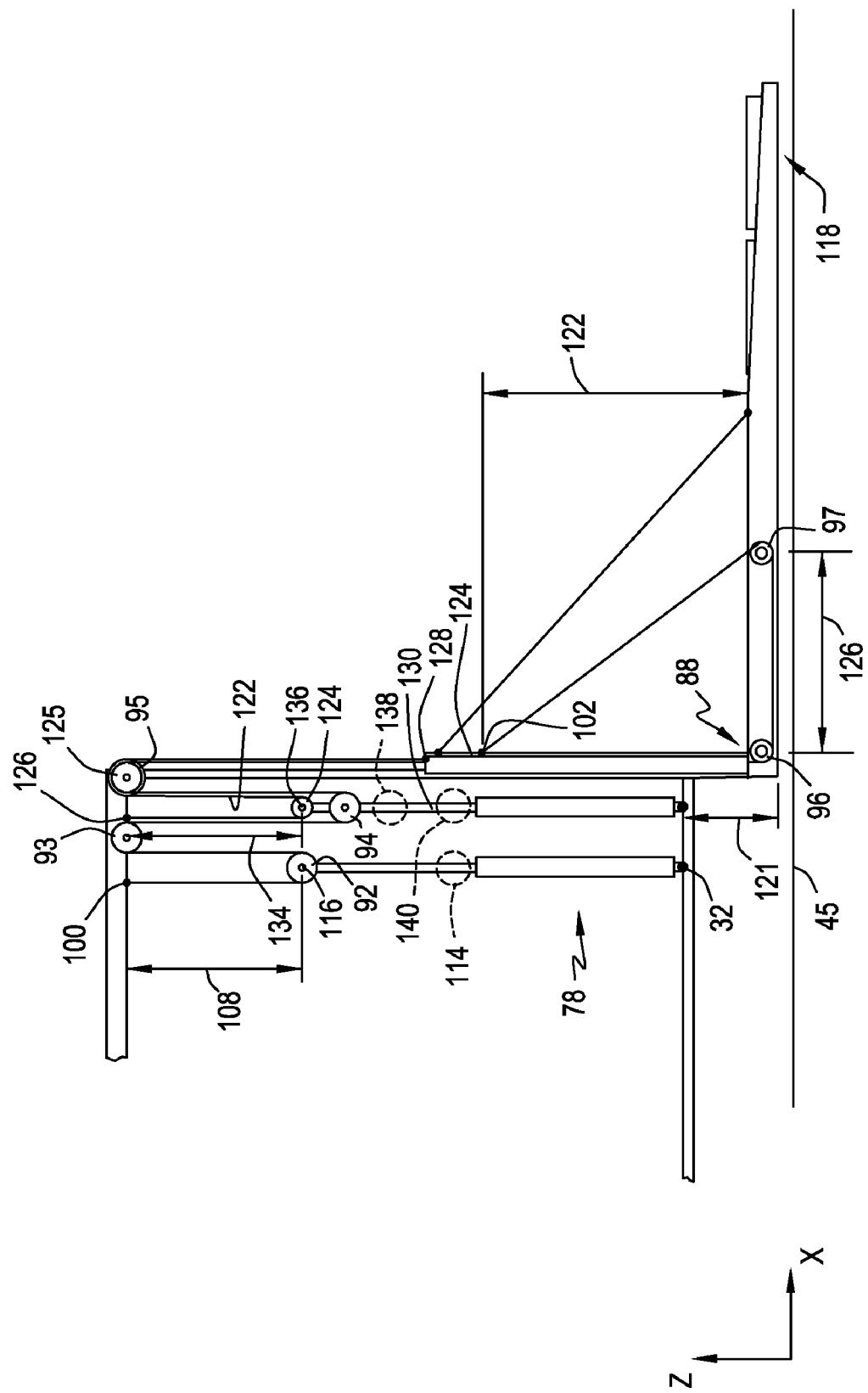
FIG. 4 is a partial, cut-away side view of a lifting mechanism associated with the multi-vehicle trailer system of FIG. 1, wherein the lifting mechanism is in a second position.
Figure 5:
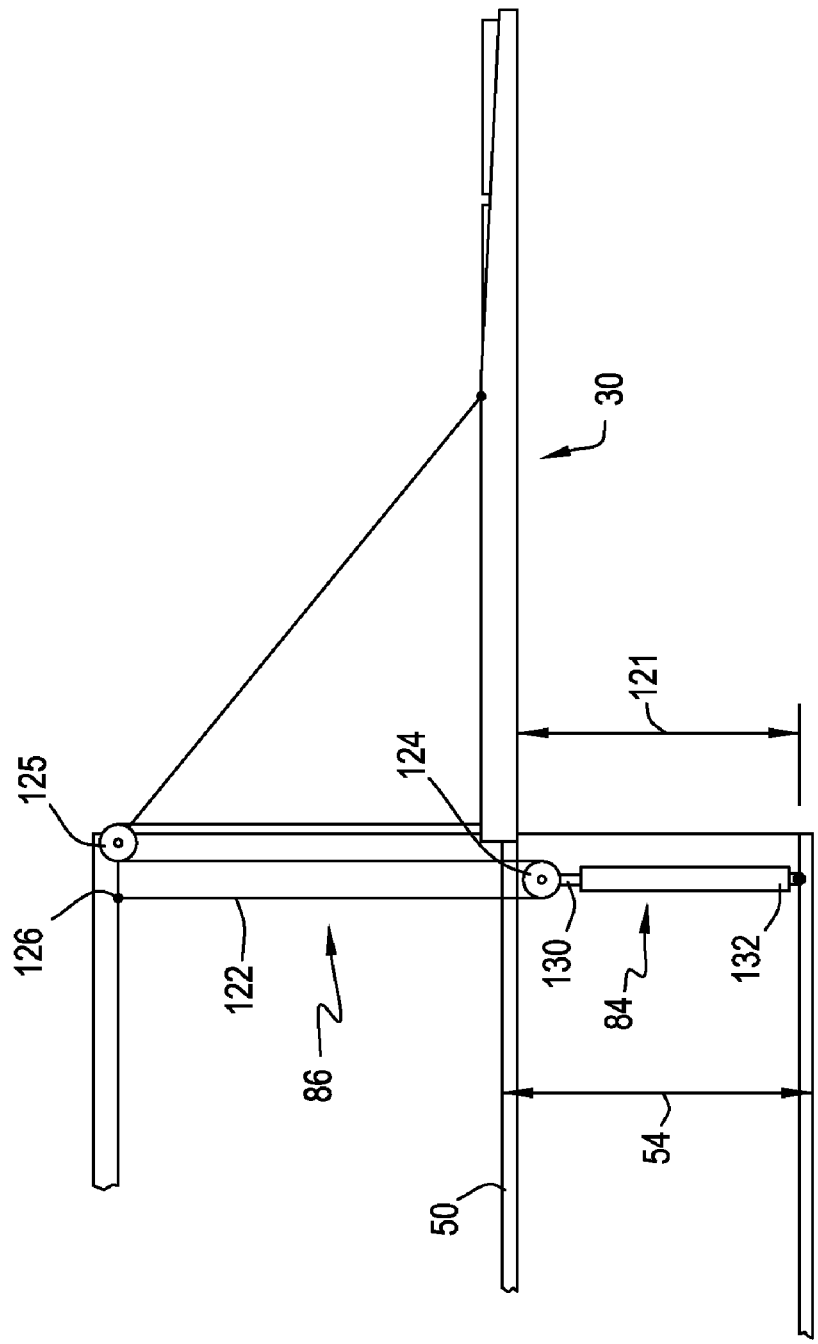
FIG. 5 is a perspective view of a portion of the lifting mechanism of FIG. 3.

Referring to FIGS. 3-5, in some aspects, trailer system 20 includes a lift system 78 operable to move gate mechanism 30 relative to trailer body 22 to enable movement of one or more of trolleys 44, 46 into and out of trailer body 22, or to open and close gate mechanism 30. For example, in some aspects, lift system 78 includes a rotational gate-lifting system comprising a first actuator mechanism 80 connected to a first transfer mechanism 82 operable to move gate mechanism 30 between a plurality of angled positions relative to floor 32 and/or open end 28 of trailer body 22. In other aspects, lift system 78 includes a linear gate-lifting system comprising a second actuator mechanism 84 connected to a second transfer mechanism 86 operable to move a connected end 88 of gate mechanism 30 between a plurality of heights relative to trailer body 22. For example, the plurality of heights include a height corresponding to one or more of a ground level 45, the first vehicle-carrying level corresponding to the height of carrying members 48 and 49, and the second vehicle-carrying level corresponding to the height of carrying members 50 and 51. It should be noted that some aspects of system 20 include both first and second actuator mechanisms 80 and 84 and transfer mechanisms 82 and 86, respectively, while other aspects include one or the other of these mechanisms.

For example, in some aspects, first and second actuator mechanisms 80 and 84 may include, but are not limited to, actuators such as an air- or hydraulic-powered piston, a motorized winch, a worm screw and follower mechanism, linkages, gears, cams, etc.

For example, first and second transfer mechanisms 82 and 86 may include but are not limited to, motion-transferring mechanisms such as chain/cable and pulley systems, screw and follower systems, linkages, gears, cams, etc.

In some aspects, the rotational gate-lifting system comprises first actuator mechanism 80 in the form of a piston connected to first transfer mechanism 82 in the form of a chain and pulley system. For instance, first transfer mechanism 82 comprises first chain 90, which flexibly extends through a plurality of pulleys, such as pulleys 92-97, between a trailer body anchor 100 and a gate connector anchor 102. Although being flexible along its length, first chain 90 is substantially longitudinally inelastic, and thus first chain 90 has a substantially fixed longitudinal length. Pulley 92 is connected to one end of piston rod 104 of piston 106 anchored to floor 32, and thus movement of piston rod 104 changes a corresponding variable distance 108 (FIG. 4) between pulley 92 and trailer body anchor 100. Since first chain 90 has a substantially fixed longitudinal length, the movement of piston 106 changes, in a predetermined manner based on the configuration of the plurality of pulleys, a variable gate angle 110 (FIG. 3) between an axis 111 substantially parallel to a plane of gate mechanism 30 and an axis 112 substantially parallel to open second end 28. As such, gate angle 110 is a predetermined function of the movement of piston 106, and, consequently, of variable distance 108.

In general, piston 106 is operable to move piston rod 104 and hence pulley 92 between a first position 114 (FIG. 4), corresponding to gate angle 110 being between about 0 degrees and about ±10 degrees, and a second position 116 (FIG. 4), corresponding to gate angle 110 being between about 80 degrees and about 150 degrees. By providing gate angle 110 greater than about 90 degrees, system 20 allows a non-connected end 118 of gate mechanism 30 to be lower than connected end 88 of the gate, for example, to allow free end 118 to touch the ground when connected end 88 is positioned at a given height above the ground. In other aspects, piston 106 is operable to move piston rod 104 and hence pulley 92 between first position 114, corresponding to gate angle 110 being between about greater than 0 degrees and about 5 degrees, and a second position 116, corresponding to gate angle 110 being between about 80 degrees and about 100 degrees. By providing gate angle 110 of about greater than 0 degrees to about 5 degrees, system 20 allows the weight of gate mechanism 30 to cause the gate to open when first actuator 80 moves pulley 92 toward second position 116. Further, in some aspects, piston rod 104 is substantially fully drawn-in relative to piston 106 when gate mechanism 30 is in the first or closed position, and conversely, piston rod 104 is substantially fully extended when gate mechanism 30 is in the second or open position. As such, variable distance 106 is greater in the second or open gate position than in the first or closed gate position.

Further, gate connector anchor 102 and pulley 97 have predetermined positions operable to form a variable chain angle 120 (FIG. 3) between a portion 122 of first chain 90 and plane 111 substantially parallel to gate mechanism 30. Variable chain angle 120 may vary between about 30 degrees and about 90 degrees. Further, variable chain angle 120 increases with a corresponding increase in variable gate angle 110. Gate connector anchor 102 may be positioned at a predetermined height 122 on gate carriage 124 that connects the linear movement portion of lifting system 78 to gate mechanism 30, as will be described below in more detail. Further, pulley 97 may be position at a predetermined distance 126 from connected end 88 of gate mechanism 30. In some aspects, the relative positioning of gate connector anchor 102 and pulley 97, and thus variable chain angle 120, may be designed to optimize the force applied by first chain 90 to overcome the moment of inertia of gate mechanism 30 about connected end 88 when the gate mechanism is transitioned to/from the open position, especially when gate angle 110 is greater than about 80 degrees.

Additionally, in some aspects, first actuator mechanism 80 and first transfer mechanism 82 maintain a predetermined amount of tension in first chain 90. For example, in some aspects, a change in height of gate mechanism 30 causes movement in first chain 90 if the position of first actuator mechanism 80 remains unchanged. For instance, second actuator mechanism 84 may vertically raise gate mechanism 30, and depending on the given configuration of the chain and pulley system of first transfer mechanism 82, such movement may create slack within first chain 90. In some aspects, first transfer mechanism 82 is operable to account for such movements of second actuator mechanism 84, without any desired movement of first actuator mechanism 80, by moving along with second actuator mechanism 84. For example, first transfer mechanism 82 may route first chain 90 through pulley 94, which is an idler pulley connected to second actuator mechanism 84, and pulley 95, which is another idler pulley. Due to this configuration, second actuator mechanism 84 may move and the slack that normally would be created in first chain 90 due to this movement will be accounted for through the movement of first chain 90 through idler pulleys 94 and 95. As such, in some aspects, first transfer mechanism 82 may be configured to maintain a substantially constant gate angle 110, without movement of first actuator mechanism 80, during movement of second actuator mechanism 84. In alternative aspects, the respective first and second actuator mechanisms 80, 84, and first and second transfer mechanisms 82, 86, may be completely independent systems, and trailer system 20 may include an electronic control system (not shown) operable to automatically actuate first actuator mechanism 80 by a predetermined amount, depending on the given configuration of first transfer mechanism 82, if it is set to maintain a given gate angle 110 during actuation of second actuator mechanism 84.

Additionally, in some aspects, lifting system 78 includes the linear gate-lifting portion operable to move gate mechanism 30 between a plurality of vertical positions corresponding to any given gate height 121 (FIG. 4). In some aspects, for example, gate height 121 may be measured from floor 32, where a negative number represents a distance below floor 32 and a positive number represents a distance above floor 32. Generally, the linear-lifting portion of lift system 78 vertically moves gate mechanism 30 when the gate is extended substantially horizontally in order to move the gate between about a ground level 45 (see FIG. 4), first height 52 (FIG. 1) corresponding to the $1^{st}$ level of carrying members 48-49 (not shown), and second height 54 (FIG. 1) corresponding to the $2^{nd}$ level of carrying members 50-51 (see FIG. 5). It should be noted, however, that the linear gate lifting portion of lifting mechanism 78 may be operable to vertically lift gate mechanism 30 at any gate angle 110, and further may be operable to vertically lift gate mechanism 30 across any range of distances extending from below floor 32 to a height greater than height 54 of the $2^{nd}$ level carrying members 50 and 51.

For example, in some aspects, the linear gate-lifting portion of lifting system 78 comprises second actuator mechanism 84 defined by a piston connected to second transfer mechanism 86 defined by a chain and pulley system. For example, second transfer mechanism 84 may comprise a second chain 122 which flexibly extends through a plurality of pulleys 124 and 125 between a trailer body anchor 126 and a gate connector anchor 128. Although being flexible, second chain 122 is substantially inelastic along its longitudinal length, and thus second chain 122 has a substantially fixed longitudinal length. Pulley 124 is connected to one end of piston rod 130 of piston 132 anchored to floor 32, and thus movement of piston rod 130 changes a corresponding variable distance 134 between pulley 124 and trailer body anchor 126. Since second chain 122 has a substantially fixed longitudinal length, the movement of piston 132 changes gate height 121 in a predetermined manner, based on the configuration of second transfer mechanism 86, relative to floor 32. As such, variable gate height 121 is a predetermined function of the movement of piston 132, and, consequently, of variable distance 134.

Further, referring specifically to FIG. 4, for example, piston 132 is operable to move piston rod 130 and hence pulley 124 between a first position 136 corresponding to gate height 121 being at about a ground level, a second position 138 corresponding to gate height 121 being at about first height 52 corresponding to the $1^{st}$ level of carrying members 48-49, and a third position 138 corresponding to gate height 121 being at about second height 54 corresponding to the $2^{nd}$ level of carrying members 48-49. Further, in some aspects, piston rod 130 may be substantially fully drawn-in relative to piston 132 when gate height 121 is a maximum, such as at or above second height 54, and conversely, piston rod 130 may be substantially fully extended when gate height 121 is at level corresponding to the ground. As such, variable distance 134 is greater in the when gate mechanism 30 is raised toward the $2^{nd}$ level than when the gate mechanism is lowered toward the ground level, which increases the structural stability of piston 132 by having piston rod 103 within the housing of piston 132 at a time when it is under the greatest load.

Further, it should be noted that either and/or both of the rotational gate-lifting portion and the linear gate-lifting portion of lifting system 78 may comprise a single actuator mechanism and transfer mechanism to move gate mechanism 30, or alternatively may comprise a plurality of actuator mechanisms and transfer mechanisms. For example, although FIGS. 3 and 4 only illustrate the rotational and linear gate-lifting portions of lifting system 78 at open end 38 adjacent to side wall 28, it should be noted that the rotational and linear gate-lifting portion of lifting system 78 may comprise a mirror image of the respective actuator mechanisms and transfer mechanisms adjacent to side wall 36 of open end 28, i.e. on the opposite side of open end such that both sides of gate mechanism 30 are supported. As such, in this example, gate mechanism 30 is attached at both sides to respective rotational and/or linear gate-lifting mechanisms that operate to move gate mechanism 30. Further, the one or the plurality of rotational and/o linear gate-lifting mechanisms may move both sides of gate mechanism 30 in synchronization based on an electrically-based mechanism and/or based on a mechanically-based synchronizing mechanism. For example, the electrically-based mechanism may comprise a control system operable to send electrical signals to control the respective actuator mechanisms to cause them to move in synchronization. Further, such a control system may further include error correction mechanism to account for any differences between the opposing mechanisms in order to maintain synchronization. Further, for example, the mechanically-based mechanism may include mechanical linkages, gears, etc. that mechanically interconnect the opposing mechanism so that movement in one mechanism results in a comparable movement in the opposing mechanism.

Figure 6:
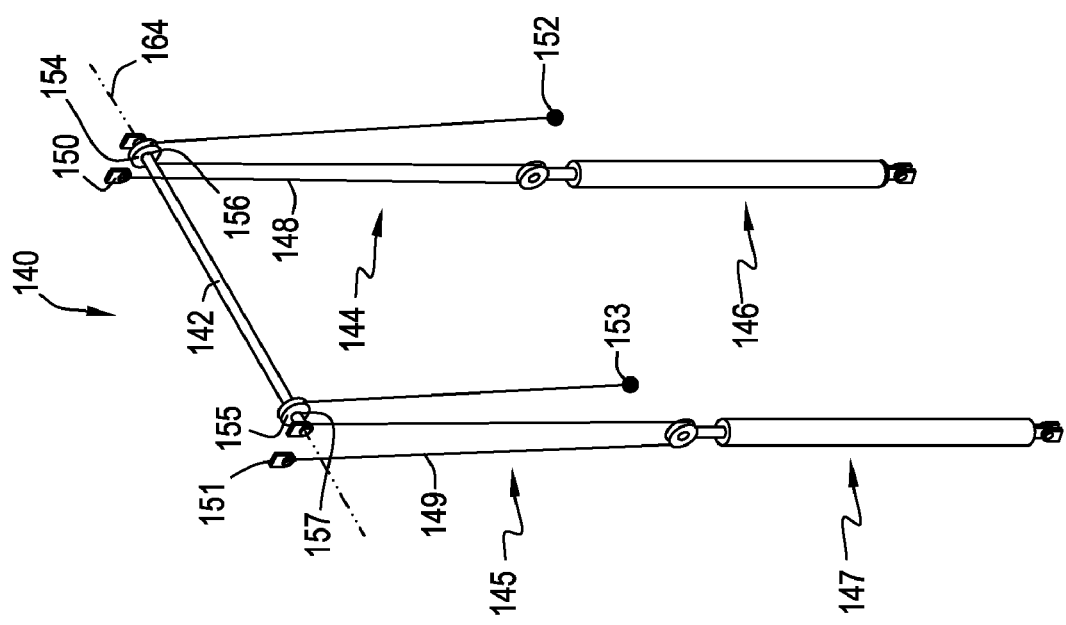
FIG. 6 is a perspective view, with hidden lines, of one aspect of a connecting member movable within a corresponding support member, both associated with the lifting mechanism of FIG. 3.

For example, referring to FIG. 6, in some aspects, a mechanically-based synchronization mechanism 140 for either of rotational and/or linear lifting portions of lift system 78 may comprise an elongated rod 142 that extends across a side of open end 28 (not shown) adjacent to ceiling 34 (not shown) to connect opposing transfer mechanisms 144 and 145 and actuator mechanisms 146 and 147, respectively. It should be noted, however, that in other aspects rod 142 could be configured to extend across a side of open end 28 (not shown) underneath floor 32 (not shown). In any case, for example, actuator mechanisms 146 and 147 may comprise the above-described pistons anchored to floor 32 (not shown) and suspended by the respective transfer mechanism. Further, for example, transfer mechanisms 144 and 145 may comprise the above-described chains, pulleys and anchors. For instance, mechanism 140 may include respective chain 148 and 149 extending between respective trailer body anchors 150 and 151 and gate connector anchors 152 and 153. Further, mechanism 140 may include pulleys 154 and 155 spaced apart on rod 142, such as positioned adjacent to the respective ends of the rod. Pulleys 154 and 155 may be fixed relative to rod 142, for example via a respective connecting member 156, 157 such as a key, so as to synchronize their movements. Further, the respective transfer mechanisms 144 and 145 may further include respective idler piston pulleys 158 and 159 connected to the piston rod of each respective piston of actuator mechanism 146 and 147. For example, when either actuator mechanism 146 or 147 moves, the movement is transferred through the respective transfer mechanism 144 or 145, i.e. the respective chain 148 or 149 and one of a piston pulley 158 or 159, and to the respective rod pulley 154 or 155. Based on the configuration of pulleys within each transfer mechanism 146 and 147, and in this case due to the idler engagement between the respective chain 148 or 149 and piston pulley 158 or 159, such as interfacing teeth and chain links, a predetermined amount of the movement of the respective chain 148 or 149 is transferred to the respective rod pulley 154 or 155, causing the respective pulley to rotate about the longitudinal axis 164 of rod 142. Then, due to the mechanical linkage through the respective key 156 or 157, rod 142 and the opposing key 157 or 156, the rotational movement is transferred to the opposing rod pulley 155 or 154. The rotational movement of the opposing pulley 155 or 154 is transferred to the opposing chain 148 or 149 and results in linear movement of the respective gate connector anchor 152 or 153. As a result, mechanically-based synchronization mechanism 140 causes both gate connector anchors 152 and 153 to move in synchronization. In a system with two actuator mechanisms 146 and 147, the load on each mechanism can be balanced, and if one mechanism does not perform properly the other mechanism can account for the deficiency. Thus, mechanically-based synchronization mechanism 140 causes both sides of gate mechanism 30 (not shown) to move, either rotationally or linearly, in a synchronized manner, which keeps gate mechanism 30 level and which also distributes the associated lifting- and/or suspension-related forces on lifting system 78.

Figure 7:
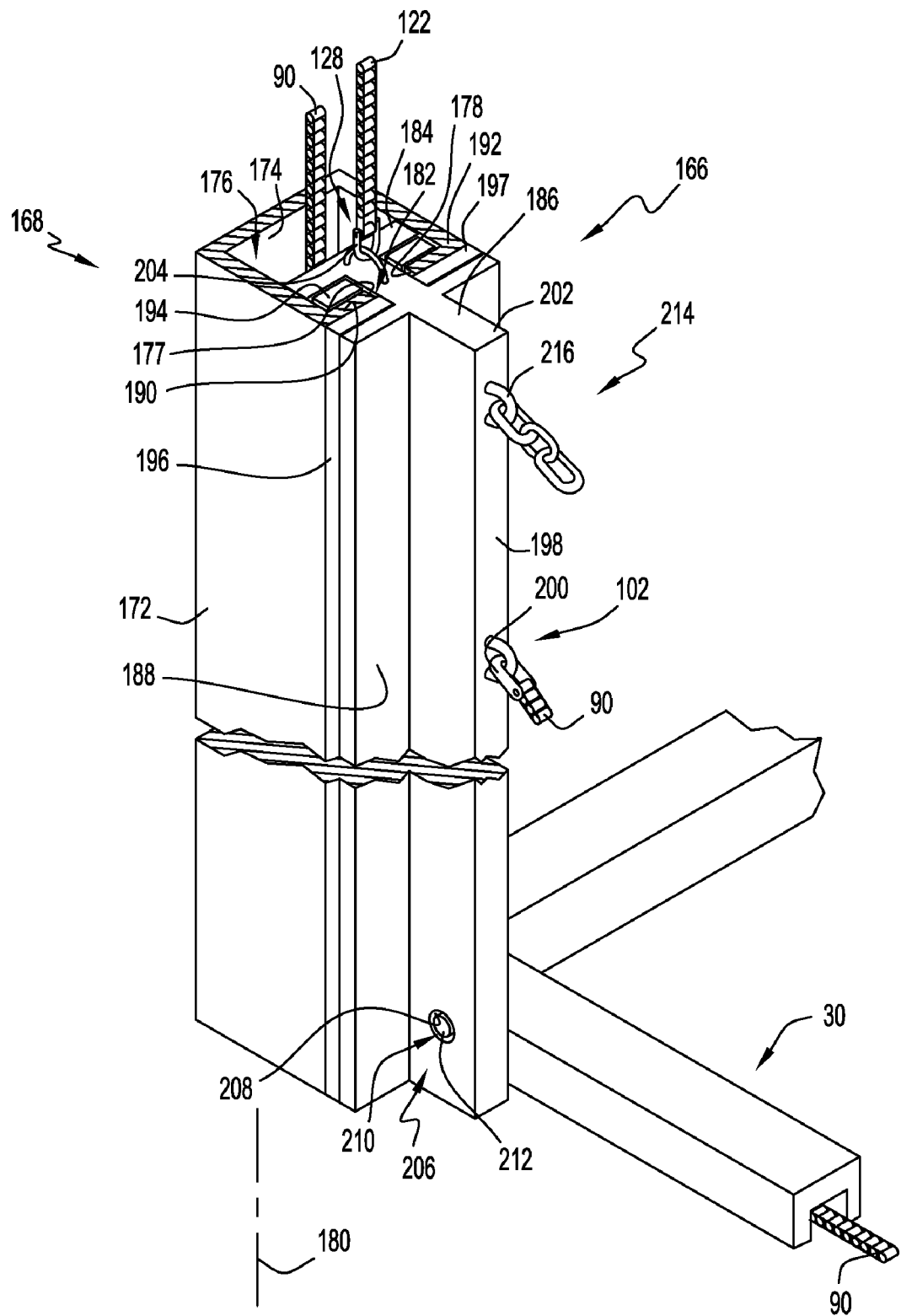
FIG. 7 is a perspective view of one aspect of a gate closing mechanism associated with the lifting mechanism of FIG. 3.

Referring to FIGS. 1 and 7, in some aspects, a gate carriage 166 is movably retained within a respective support member 168 and 170, which may comprise a column extending substantially vertically from about floor 32 to about ceiling 34 of trailer body 22 adjacent to respective side walls 36 and 38 at open second end 28. Each support member 168 and 170 may comprise an outer wall 172 that defines an outer body of the respective support member and a first inner wall 174 that defines an internal chamber 176 within which at least a portion of gate carriage 166 is movable. Further, each support member 168 and 170 comprises an opposing pair of second inner walls 177, 178 formed between outer wall 172 and first inner wall 174. The opposing pair of second inner walls 177, 178 each extending vertically and substantially parallel to a longitudinal axis 180 of each respective support member 168 and 170, thereby defining a longitudinally extending slot 182. A base portion 184 of gate carriage 166 is sized to movably fit within internal chamber 176, and a first flange portion 186 extending from base portion 184 is sized to movably fit within slot 182. In some aspects, for example, base portion 184 has a width less than the corresponding width of internal chamber 176 to minimize or eliminate contact there between. In other aspects, for example, base portion 184 has a width only slightly less than the corresponding with of internal chamber 176 to enable internal chamber 176 to guide first flange portion 186. Further, in some aspects, for example, first flange portion 186 has a width less than the corresponding with of slot 182 to minimize or eliminate contact there between. In other aspects, for example, first flange portion 186 has a width only slightly less than the corresponding width of slot 182 to enable slot 182 to guide first flange portion 186. Further, a second flange portion 188 extends from first flange portion 186 and is positioned substantially parallel to and spaced apart from base portion 184. Adjacent to each one of the respective pair of second inner walls 177, 178, respective side portions 190 and 192 of outer body are sized to fit in the space between second flange portion 188 and base portion 184. As such, a respective gate carriage 166 is movable within internal chamber 176 and/or slot 182 in a direction substantially parallel to longitudinal axis 180, while first inner wall 174, the respective side portions 190 and 192, and/or the opposing pair of second inner walls 177, 178 guide the longitudinal movement and limit movement transverse to longitudinal axis 180.

Further, in some aspects, friction-reducing mechanisms 194-196 may be placed between each gate carriage 166 and each respective support member 168 and 170 to reduce friction in the case of sliding contact between the mechanism and column. Friction-reducing mechanisms 194-197 may include, but are not limited to, mechanisms such as a lubricant, including grease and/or oil, a ball bearing, a roller bearing, and/or a material providing a relatively lower coefficient of friction when compared to the coefficient of friction between the materials of each gate carriage 166 and each respective support member 168 and 170, such as a plastic, a felt impregnated with a lubricant, etc. For example, in some aspects, friction-reducing mechanisms 194-195 may be placed between base portion 184 and an inner side of each respective side portion 190, 192, as well as between second flange portion 188. Similarly, for example, friction reducing mechanisms 196 and 197 may be placed between an outer side of each respective side portion 190, 192 and second flange portion 188. In some aspects, the respective friction-reducing mechanisms 194-197 may be fixed to and longitudinally extend along all or a portion of the adjacent portions, i.e. base portion 184 and second flange portion 188, of gate carriage 166. In addition or alternatively, in other aspects, respective friction-reducing mechanisms 194-197 may be fixed to the adjacent portions, i.e. inside and outside walls of each respective side portion 190 and 192, of each respective support member 168 and 170.

Additionally, as discussed above, each gate carriage 166 may include anchors for attachment of the respective portions of one or more transfer mechanisms 82 and 86. For example, such anchors may include through-holes, loops, rings, pins, harnesses, collars, and any other mechanism capable of fixedly securing each respective transfer mechanism to each gate carriage. In some aspects, each gate carriage 166 may comprise gate connector anchor 102 operable to connect first chain 90 of first transfer mechanism 82 to the respective gate carriage 166. For example, gate connector anchor 102 may comprise a loop or ring of material, affixed to a front surface 198 of gate carriage 166, through which a collar 200 may be attached and secured to chain 90. In other aspects, each gate carriage 166 may comprise gate connector anchor 128 operable to connect second chain 122 of first transfer mechanism 82 to the respective gate carriage 166. For example, gate connector anchor 128 may comprise a loop or ring of material, affixed to a top surface 202 of gate carriage 166, through which a collar 204 may be attached and secured to second chain 122.

Further, in some aspects, a gate coupling 206 may be operable to rotatably secure gate carriage 166 with connected end 88 of gate mechanism 30 to allow the rotational portion of lifting system 78 to change gate angle 110. Gate coupling 206 may include corresponding structures formed within gate carriage 166 and in gate mechanism 30, and/or may include other independent mechanisms operable to rotatably connect the two structures. For example, gate coupling 206 may include, but is not limited to, mechanisms such as a hook and a loop, a through-hole and a pin, rod or axle, a harness, a collar, and any other mechanism capable of rotatably securing gate carriage 166 and gate mechanism 30. Further, for example, in some aspects, gate coupling 206 may include an internal wall 208 within first flange portion 186 of gate carriage 166. Internal wall 208 defines a through-hole 210 through which extends a shaft 212 affixed to connected end 88 of gate mechanism 30. Further, in some aspects, a bearing member (not shown) such as a roller bearing, pin bearing, low friction material, etc., may be positioned within hole 210 between internal wall 208 and shaft 212 to secure the shaft within the hole and to improve the ease of rotation of the shaft with respect to the internal wall.

In further aspects, referring still to FIGS. 1 and 7, trailer system 20 may further include one or more gate support mechanisms 214 operable to attach between one or both sides of gate mechanism 30 and a respective one or both of gate carriages 166. Gate support mechanism 214 comprises an elongated, inelastic material that limits the maximum value of gate angle 110. For example, gate support mechanism 214 may include, but is not limited to, one or any combination of mechanisms such as a cable, a chain, a linkage, and any other mechanism that limits the amount that gate mechanism may be rotatably moved away from open end 28. Gate support mechanism 214 may be secured to a support anchor 216 associated with gate carriage 166, such as anchoring systems similar to those described above.

Further, it should be noted that in some configurations, first chain 90 may extend through internal chamber 176 of each respective support member 168 and 170. For example, internal chamber 176 may be sized such that gate connector mechanism 166 occupies a front portion of internal chamber 176, leaving a rear portion open for use by first chain 90. After passing through each respective support member 168 and 170, first chain may then be routed through or adjacent to side portions of gate mechanism 30, as generally illustrated in FIG. 4.

Additionally, referring to FIG. 1, trailer system 20 may further include a pair of ramps 218, 220 positionable at a free end 118 of gate mechanism 30 and respectively alignable with the left and right side wheels of a vehicle to be loaded onto and/or unloaded off of trailer system 20. For example, ramps 218, 220 extend longitudinally from a relatively thicker first end 224 to a relatively thinner second end 226. For instance, first end 224 has a height corresponding to the height of free end 118 of gate mechanism 30 and/or the height of first or second vehicle trolley 44 or 46 when positioned on carrying members 74, 76 of gate mechanism 30. Further, for instance, second end 226 may have a substantially smaller height than first end 224, or may form an edge with a bottom surface 228 of the respective ramp 218, 220 and thus have substantially no height.

In operation, referring to FIGS. 8-12, in some aspects, a method of loading a vehicle 230 within trailer system 20 includes moving vehicle 230 up each ramp 218, 220 (not shown) such that the vehicle's front wheels 232 roll over second vehicle trolley 46 and are positioned within wheel beds 73 and 75 (not shown) on first vehicle trolley 44 (see, e.g., FIG. 8).

Vehicle 230 is then advance further along first and second bearing assemblies 64 and 66 of gate mechanism 30 toward open second end 28 of trailer body 22, with first vehicle trolley 44 operable to support and carry the front portion of the vehicle, until the vehicle's rear wheels 234 are positioned within wheel beds 73 and 75 (not shown) on second vehicle trolley 46 (see, e.g., FIG. 9).

At this point, or any time hereafter, vehicle wheels 232 and 234 may be secured to the respective trolley 44, 46, such as via straps and buckles, etc. Further, at this point, each trolley 44 and 46 may be secured relative to first and second bearing assemblies 64 and 66 (not shown) and/or other portions of gate mechanism 30, such as via locking pins, blocks, etc.

Then, the method includes activating the linear-movement portion of lifting system 78 to raise gate mechanism 30 to any predetermined height, such as a height corresponding to the first or second level of the respective carrying members 48-49 and 50-51 mounted within trailer body 22 (see, e.g., FIGS. 10 and 11).

Figure 12:
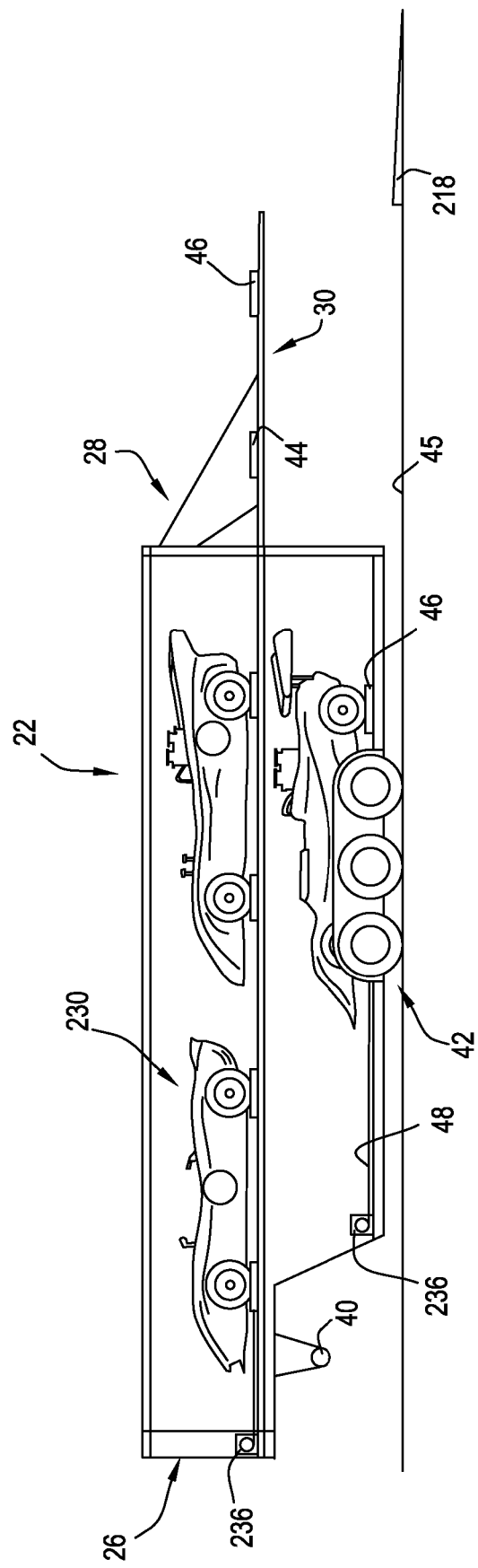
FIG. 12 is a side, cut-away view of a plurality of vehicles loaded into the multi-vehicle trailer system.

Once reaching the predetermined height, such as the height at which the top surfaces of first and second bearing assemblies 64 and 66 of gate mechanism 30 are substantially aligned with the respective top surfaces of carrying members 48-49 or 50-51, any mechanisms used to secure trolleys 44 and 46 to gate mechanism 30 can be removed, and vehicle 230 may be moved within trailer body 22 (see, e.g., FIG. 12). In some aspects, a transport mechanism 236 may be utilized to move vehicle 230 and trolleys 44, 46 along first and second bearing assemblies 64 and 66 and/or carrying members 48-49 or 50-51. For example, in some aspects, transport mechanism 236 may include, but is not limited to, a manual or motorized winch, including a rotatable drum and cable or rope, or a capstan having a separate cable or rope, located at or near closed first end 26. The cable may have a hook at its free end that may be connected to vehicle 230 and/or trolley 44 to pull vehicle 230 and trolleys 44, 46 along the respective carrying member 48-49 or 50-51 to a predetermined position within trailer body 22. It should be noted that transport mechanism 236 may take many other forms, such as a worm gear extending adjacent to one or both of each pair of carrying member 48-49 or 50-51 that interfaces with corresponding teeth on each trolley 44 and 46, a motorized wheel or set of wheels associated with one or more of first and second carriages 56 and 58, one or more motorized wheels associated with one or both of each pair of carrying member 48-49 or 50-51, etc. In any case, using the above-stated methodology, one or a plurality of vehicles may be loaded into a corresponding one or more positions within trailer body 22.

Once in place, the method may further include securing trolleys 44 and 46 in place relative to one or both of each pair of carrying member 48-49 or 50-51, such as by a locking pin, a locking block, etc.

Thus, multi-vehicle trailer system 20 is operable to load and transport one or a plurality of vehicles secured on one or more levels within trailer body 22.

The method of unloading vehicles loaded onto trailer system 20 is substantially the opposite of the above-described loading process. In the case of unloading, for example, transport mechanism 236 may be removable from closed first end 26 and secured to a free end 118 of gate mechanism 30, or secured adjacent to open second end 28, to assist in moving vehicles onto the open gate mechanism 30.

The above-described aspects provide a simple and efficient system loading, transporting and unloading one or more vehicles. Further, through the use of trolleys 44 and 46 and carrying member 48-49 or 50-51, the space within trailer body 22 is vertically undivided, thereby allowing the full vertical height inside trailer body 22 to be utilized when vehicles are not loaded. Additionally, through the use of the rotational and linear portions of lifting system 78, efficient and safe mechanisms are provided for maneuvering gate mechanism 30 between open and closed states, and between varying heights associated with the loading and unloading process. Thus, trailer system 20 advantageously provides improved mechanisms for loading, transporting and unloading one or more vehicles.

With the benefit of the teachings presented in the foregoing descriptions and the associated drawings, many modifications and other variations of the invention will come to mind to one skilled in the art to which this invention pertains. Therefore, it is to be understood that the invention is not to be limited to the specific aspects disclosed and that modifications and other aspects are intended to be included within the scope of the appended claims. Although specific terms are employed herein, they are used in a generic and descriptive sense only and not for purposes of limitation

What is claimed is:

1. A trailer, comprising:
   a body defining an interior space sized to fit a vehicle;
   a first set of carrying members attachable to the body and defining a first loading level;
   a second set of carrying members attachable to the body and defining a second loading level;
   a gate movable between a first position corresponding to the first level and a second position corresponding to a second level, wherein the second level is above the first level, and the gate having a first end and a second end defining a gate length and a first side and a second side defining a gate width;
   a first support member and a second support member each supporting member having a longitudinal length extending from the first level to the second level, the first support member spaced apart from the second support member and adjacent to the first end of the gate, the second support member adjacent to the first end of the gate;
   a first connecting member and a second connecting member respectively movable against the first support member and the second support member and along the respective longitudinal lengths, and the first connecting member attachable to the first end of the gate, and the second connecting member attachable to the second end of the gate;
   an actuator system, operable to move the gate, comprising a first actuator mechanism and a second actuator mechanism each actuator mechanism having a first extended position corresponding to the first position of the gate and a second contracted position corresponding to the second position of the gate; and
   a synchronization assembly connectable between the first actuator mechanism, the second actuator mechanism, the first connecting member, and the second connecting member, wherein the synchronization assembly synchronizes movement of the first connecting member and the second connecting member along the respective longitudinal lengths of the first support member and the second support member.

2. The trailer of claim 1, wherein the synchronization assembly further comprises:
   a first idler and a second idler respectively rotatably connected to the first actuator mechanism and the second actuator mechanism;
   a first anchor and a second anchor respectively attached to the body;
   a shaft rotatably connected to the body;
   a first flexible connecting member connectable between the first anchor and the first connecting member through the first idler and the rotatable shaft; and
   a second flexible connecting member connectable between the second anchor and the second connecting member through the second idler and the rotatable shaft.

3. The trailer of claim 2, further comprising a first timing sprocket connected to the shaft and a second timing sprocket spaced apart from the first timing sprocket and connected to the shaft, wherein the first flexible connecting member is movably connected to the first timing sprocket and wherein the second flexible connecting member is movably connected to the second timing sprocket.

4. The trailer of claim 2, wherein the first flexible connecting member and the second flexible connecting member are selected from the group consisting of a chain, a belt, and a cable.

5. The trailer of claim 1, wherein the gate is rotatably attached to the first connecting member and the second connecting member such that the gate is rotatable between a third position and a fourth position.

6. The trailer of claim 5, further comprising:
   an opening and closing mechanism attached to the gate and operable to move the gate between the third position and the fourth position.

7. The trailer of claim 2, wherein the first support member and the second support member respectively comprise at least one wall that respectively define a first support cavity and a second support cavity extending the respective longitudinal lengths, the first support cavity sized so that at least a portion of the first connecting member and the first flexible connecting member are movable therein, and the second support cavity sized so that at least a portion of the second connecting member and the second flexible connecting member are movable therein.

8. The trailer of claim 7, wherein the respective walls each comprise spaced apart, opposing ends that respectively define a first support member slit and a second support member slit each slit extending along at least a portion of the respective longitudinal length, and wherein the first connecting member and the second connecting member each further comprise an inner portion connected to an outer portion, each inner portion movable within the respective one of the first support cavity and the second support cavity, and the outer portions movable within the respective one of the first support member slit and the second support member slit.

9. The trailer of claim 8, wherein at least one of the respective support cavities and the respective support member slits are sized to limit movement of the respective first connecting member and second connecting member transverse to the respective longitudinal length.

10. The trailer of claim 1, wherein the synchronization assembly further comprises:
a first idler assembly connectable between the first actuator mechanism and the first connecting member;
a second idler assembly connectable between the second actuator mechanism and the second connecting member; and
wherein the first idler assembly and the second idler assembly are movable relative to one another to synchronize movement of the respective first connecting member and the second connecting member when a corresponding movement of the first actuator mechanism and the second actuator mechanism is not synchronized.

11. The trailer of claim 1, further comprising at least one vehicle trolley operable to extend between and be movably supported by at least one of the first set of carrying members and the second set of carrying members, wherein the at least one vehicle trolley is further operable to carry at least a portion of a trailered vehicle.

12. The trailer of claim 11, further comprising a trailered vehicle at least partially movably supported by the at least one vehicle trolley.

13. The trailer of claim 11, wherein the gate further comprises a set of gate carrying members operable to communicate with the first set of carrying members when the gate is in the first position and the second set of carrying members when the gate is in the second position, and wherein the at least one trolley is operable to move between the set of gate carrying members and a respective one of the first set of carrying members and the second set of carrying members.

14. The trailer of claim 13, further comprising a transport mechanism connectable with the at least one trolley and operable to move the at least one trolley along at least a portion of at least one of the first set of carrying members, the second set of carrying members and the set of gate carrying members.

* * * * *